United States Patent [19]

Klein et al.

[11] 3,755,996
[45] Sept. 4, 1973

[54] STRUCTURE FOR INCREASING THE SEPARATION CAPACITY OF CENTRIFUGAL FORCE SEPARATORS FOR STEAM DRYING

[75] Inventors: Heinrich Klein; Rudolf Pieper, both of Erlangen; Alfred Hoffmann, Forchhiem, all of Germany

[73] Assignee: Siemens Aktiengesellschaft, Berlin and Munich, Germany

[22] Filed: Oct. 12, 1971

[21] Appl. No.: 188,101

[30] Foreign Application Priority Data
Oct. 19, 1970 Germany .................. P 20 51 180.2

[52] U.S. Cl. ............................ 55/459, 55/DIG. 23
[51] Int. Cl. ............................................. B04c 5/04
[58] Field of Search ...................... 55/459, 460, 447, 55/448, 449, 450, 451, 452, 453, 454, 455, 456, 457, 458, 426, 427, 391, 403, 404, 405, DIG. 23

[56] References Cited
UNITED STATES PATENTS
2,293,740  8/1942  Kooistra ...................... 55/459 X
2,452,723  11/1948  Bourne et al. ................ 55/449 X
2,811,219  10/1957  Wenzl .......................... 137/388

Primary Examiner—Dennis E. Talbert, Jr.
Attorney—Arthur E. Wilfond, Herbert L. Lerner et al.

[57] ABSTRACT

A structure for increasing the separation capacity of a centrifugal-force separator for separating water from a steam-water mix includes a separator having a cylindrical turbulence chamber, and an inlet in the chamber for receiving the mix therein and for directing the same tangentially along the inner wall of the chamber and imparting to the mix a spin motion for separating the water from the mix and for forming a funnel-like figure of steam. The chamber has an axial outlet in the upper region thereof for passing the steam therefrom and a water outlet in the lower region thereof for passing the water therefrom. The structure has a dish-like plate disposed coaxially with respect to the chamber at the lower region thereof for stabilizing the funnel-like figure.

6 Claims, 6 Drawing Figures

PATENTED SEP 4 1973
3,755,996

STRUCTURE FOR INCREASING THE SEPARATION CAPACITY OF CENTRIFUGAL FORCE SEPARATORS FOR STEAM DRYING

My invention relates to a structure for increasing the separating capacity of centrifugal-force separators. This structure is especially applicable for steam drying in steam generators.

For steam drying especially in steam generators of nuclear power plants, coarse and fine separators are generally used. The coarse separator functions primarily on a centrifugal force basis, where especially the conventional tangential cyclone is applicable. The separation of this type of tangential cyclone is relatively small even through the centrifugal force which is developed in such systems with a rotating flow should be adequate to separate all water droplets entrained with the steam.

From the steam-water mix which enters tangentially in the upper region of the separator, the water is thrown against the walls of the turbulence chamber by the action of the centrifugal force, and from there, runs upwardly. This causes a boundary layer to be formed between the water in the region of the wall of the turbulence chamber and the lighter steam in the axial region of the separator. The layer in most instances takes on the shape of a funnel which in longitudinal section approximates a cone-shaped or parabolic form. However, in the conventional configuration of this type of centrifugal-force separator, the position of the funnel figure or form is not stable, instead, the lowest point of the boundary layer, the so-called funnel foot, wanders back and forth in an uncontrolled manner over a more or less large region of the cross-section of the turbulence chamber and can wander downwardly toward the bottom entirely out of the turbulence chamber. This can cause the already separated water to become reentrained in the clarified steam flow or can cause the steam to be torn away from the axial region of the turbulence chamber with the separated water toward the bottom so that a considerable decrease in efficiency occurs.

It is an object of our invention to provide a structure for substantially increasing the separating capacity of the above-mentioned type of centrifugal-force separator.

According to a feature of the invention a dish-like plate is arranged coaxially with respect to the turbulence chamber at the lower portion thereof for stabilizing the funnel formed in the turbulence chamber.

With this arrangement of this type of plate the foot of the funnel can be stabilized so as to define more precisely the flow path in a coarse separator. Among other things, this prevents the funnel, which encloses steam, to be extended toward the bottom of the turbulence chamber and therewith prevents the steam from becoming entrained by the water to be separated.

For improving the stabilization action, it is preferable if the dish-like plate is formed at its outer edge with a ring-shaped extension or rise to reduce the lateral movement of the funnel foot.

In addition, it is preferable if the plate is configured as a funnel-like member and extends over the entire end face of the turbulence chamber with the provision that an outlet gap be provided at the periphery for the separated water. For this purpose, the funnel-like plate can have a larger diameter than the turbulence chamber and be provided at its outer edge with a tube-like rise to serve as an overflow plate.

In this way, the result is achieved that firstly, the funnel is stabilized, and secondly, that water is always contained in the lower portion of the turbulence chamber, which prevents a penetration of the steam funnel into the outer region. In addition, this funnel-like plate can be applied for recovering energy in that this plate with a radially extending and perpendicularly arranged vane-guide plates are provided for energy recovery. The guide plates can be arranged either at the upper end of the funnel-like plate and have a height increasing from the center to the edge of the plate, or, these vane-guide plates can simply be arranged at the edge of the plate in the ring gap between the turbulence chamber and the overflow plate. For increasing the energy recovery, it is preferable if these guide vanes are given in a curved shape so that the spinning action inherent to the outflowing water can be recovered.

For further increasing the separating capacity, it is also possible to arrange above the funnel-like plate a dish-like plate having an added cylindrical edge. In addition, at the upper end of the dish-like plate, an approximately cylindrical stabilization body can be arranged as, for example, a pelton needle or a short pipe or tube.

Although the invention is illustrated and described herein as a structure for increasing the separating capacity of centrifugal-force separators used in steam drying, it is nevertheless not intended to be limited to the details shown, since various modifications may be made therein within the scope and the range of the claims. The invention, however, together with additional objects and advantages, will best be understood from the following description and in connection with the accompanying drawings, in which:

Figure 1:
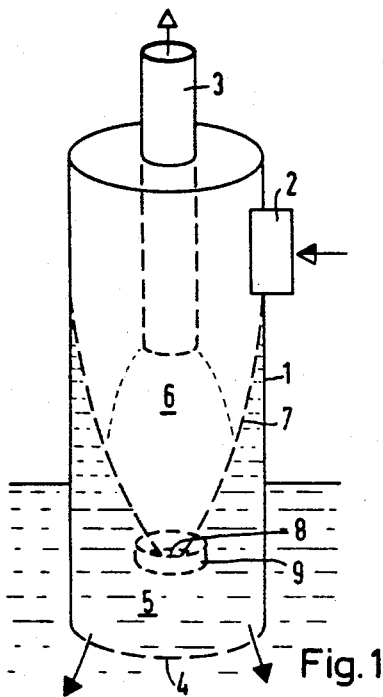
FIG. 1 is a schematic diagram of tangential cyclone equipped with an inserted dish-like plate as required by the invention.

Referring to FIG. 1, the centrifugal-force separator comprises a cylindrical turbulence chamber 1 with a tangential inlet 2 for the steam-water mix as well as an axial outlet 3 for the steam cleaned from the water at the upper end of the turbulence chamber 1. Also provided, is an opening 4 at the lower end of the turbulence chamber for directing away the separated water.

The heavier component, water, is thrown from the tangentially entering steam-water mix by the action of the centrifugal force. The water is thrown against the inner wall of the turbulence chamber 1 and runs from there towards the bottom to return to the water collection basin or to the actual steam generator via the outlet 4. By the action of the centrifugal force, there is formed a boundary layer 7 between the water 5 in the region close to the wall of the turbulence chamber 1 and the lighter steam 6 in axial region of the turbulence chamber. The boundary layer 7 has an approximately cone-like or parabolic cross-section and is formed by the action of the funnel which forms within the turbulence chamber.

According to the invention, in the lower region of the turbulence chamber, there is arranged a dish-like plate 8 which is preferably provided with a ring-shaped rise 9 at the outer edge. By providing this structure, the funnel foot is prevented from wandering uncontrollably back and forth over the cross-section of the turbulence chamber and from eventually becoming extended toward the bottom by the force of the outflowing water, so that the steam flows away downwardly toward the bottom. This plate stabilizes the funnel foot so that the flow path in the separator is more precisely defined and thereby prevents a penetration of the steam funnel toward the bottom or an entrainment of water already separated with the steam flowing toward the top.

Figure 2:
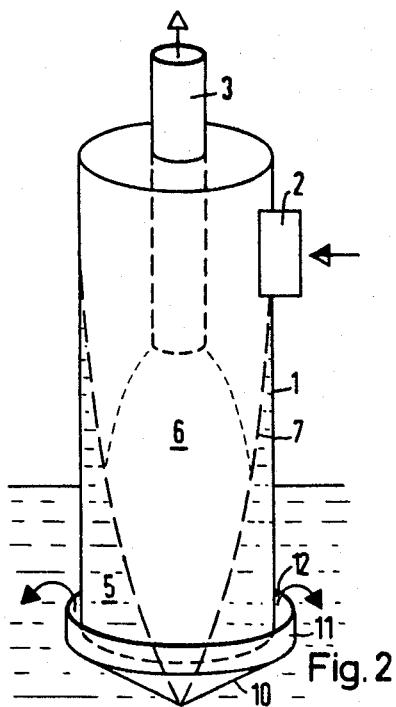
FIG. 2 is a schematic diagram of an arrangement of a funnel-like plate arranged with respect to a turbulence chamber to serve as the lower closure thereof.

According to FIG. 2, this plate is configured as a funnel-like lower closure 10 of the turbulence chamber and has a diameter larger than that of the turbulence chamber. The funnel-like plate is provided with a rise 11 at its outer edge to function as an overflow. Because the ring gap 12 remains unobstructed between the rise or overflow plate portion 11 and the wall of the turbulence chamber 1, the separated water can flow away toward the bottom. Also with this embodiment, the funnel 7 within the turbulence chamber is stabilized with certainty since the funnel foot rests at the deepest point of the turbulence chamber in the funnel-like plate.

Figure 2A:
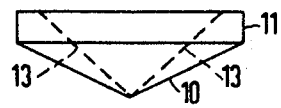
FIGS. 2a and 2b illustrate the configuration of energy recovery plates.

With this type of configuration of the plate, an energy recovery is possible in order to recover the spin motion still inherent in the separating water. For this purpose, as is illustrated in FIG. 2a, radial guide vanes 13 are arranged on the upper end of the funnel-like plate, these guide vanes preferably having a height increasing from the center toward the outside. It is, however, also possible to provide simply guide vanes 14 in the ring gap 12 which also operate to guarantee this type of energy recovery. It is especially advantageous if these guide vanes 13 or 14 are given a curved shape, so as to better counteract the spin motion of the water.

Figure 3:
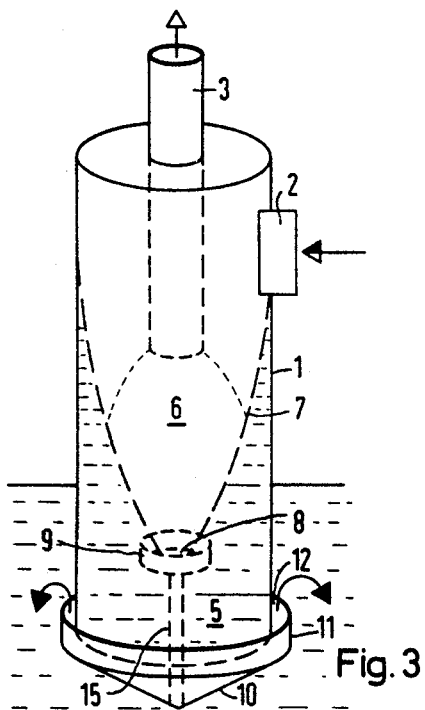
FIG. 3 and 3a is a schematic representation of a tangential cyclone equipped with a combination of dish-like and funnel-like plates for stabilizing the funnel foot.
Figure 2B:

FIG. 3 is a combination of both of these embodiments and obtains a still better rate of separation of the centrifugal force separator. The turbulence chamber 1 is first also provided with a funnel-like plate at the lower end with an unobstructed flow-off gap 12 between the overflow plate 11 and the turbulence chamber wall 1. Above this plate 10 there is likewise provided a dish-like plate 8 having a ring-shaped rise 9 which, for example, can be joined with the base-plate 10 via a support 15. With this type of combination, the position of the funnel of the turbulence chamber is precisely determined and a certain stabilization is guaranteed even if the funnel foot jumps over the rise 9. In addition, corresponding plates can be installed here also as illustrated in FIGS. 2a and 2b for obtaining an energy recovery of the outflowing water.

Figure 3A:
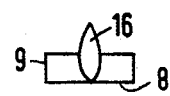

FIG. 3a illustrates still another embodiment for stabilizing the funnel. A stabilization body 16, for example, in the form of a pelton needle is arranged in the center of the dish-like plate 8. It is, however, also possible to configure this additional stabilization body in form of a short tube or a cylinder.

By means of the embodiments described, it is also possible in a simple manner to considerably increase the separation rate of a conventional centrifugal-force separator. In this way, first steam is prevented from being pulled toward the bottom by the separating water whereby the steam yield is increased and second, the actual separating rate can be increased through a precise position stabilization of the funnel so that the residual water particles of the steam are reduced. The structure of the invention enables a considerable savings to be realized for the fine separator which normally is connected after the coarse separator.

The above-described embodiments of the invention are not only applicable to centrifugal-force separators in the form of counter-flow cyclones with a tangential inlet; they can also be applied to separators having a mix inlet over a guide vane wreath-like structure extending concentrically to the partially immersed tube.

These separators can be installed directly in the actual steam generator as well as before a reheater or directly in front of a turbine, that is at every separating location in the secondary circulation path.

We claim:

1. Structure for increasing the separation capacity of a centrifugal-force separator for separating water from a steam-water mix, said structure comprising a separator having a cylindrical turbulence chamber, an inlet in said chamber for receiving the mix therein and for directing the same tangentially along the inner wall of said chamber and imparting to the mix a spin motion for separating the water from the mix and for forming a funnel-like figure of steam, said chamber having an axial outlet in the upper region thereof for passing the steam therefrom and a water outlet in the lower region thereof for passing the water therefrom, and a dish-like plate disposed co-axially with respect to said chamber at said lower region thereof for stabilizing said funnel-like figure, said plate having a funnel-like shape and extending laterally so as to cover the entire lower end of said chamber, said water outlet being a gap defined by the periphery of said plate and said lower end of said chamber, said plate having a diameter greater than the diameter of said chamber, and having a tube-shaped overflow rise at its outer periphery, said plate having vertical, radially extending guide vane plates for recovering said spinning motion, said guide vane plates being arranged on the top side of said funnel-like shaped plate, said guide vane plates having a height increasing with increasing radial distance from the center of said funnel-like shaped plate to the edge thereof.

2. Structure of claim 1, said funnel-like shaped plate having a second set of guide vane plates at said edge in said gap between said chamber and said over-flow rise.

3. Structure of claim 2, said guide vane plates having a curved shape.

4. Structure for increasing the separation capacity of a centrifugal-force separator for separating water from a steam-water mix, said structure comprising a separator having a cylindrical turbulence chamber, an inlet in said chamber for receiving the mix therein and for directing the same tangentially along the inner wall of said chamber and imparting to the mix a spin motion for separating the water from the mix and for forming a funnel-like figure of steam, said chamber having an axial outlet in the upper region thereof for passing the steam therefrom and a water outlet in the lower region thereof for passing the water therefrom, a dish-like plate disposed coaxially with respect to said chamber at said lower region thereof for stabilizing said funnel-like figure, said plate having a funnel-like shape and extending laterally so as to cover the entire lower end of said chamber, said water outlet being a gap defined by the periphery of said plate and said lower end of said chamber, and an additional dish-like plate disposed above said plate having said funnel-like shape, said additional dish-like plate having a cylindrical rim placed thereupon.

5. Structure of claim 4, said additional dish-like plate having an approximately cylindrical stabilization body arranged on the upper side thereof.

6. Structure of claim 5, said stabilization body being a pelton needle.

* * * * *